United States Patent [19]

Johnston

[11] Patent Number: 4,819,910

[45] Date of Patent: Apr. 11, 1989

[54] TRAILER LEVELER

[76] Inventor: Paul F. Johnston, 1432 Nunneley Rd., Paradise, Calif. 95969

[21] Appl. No.: 227,004

[22] Filed: Aug. 1, 1988

[51] Int. Cl.⁴ ............................................. E02C 3/00
[52] U.S. Cl. ....................................................... 254/88
[58] Field of Search .................... 188/32; 152/213 R; 254/88

[56] References Cited

U.S. PATENT DOCUMENTS

| | | | |
|---|---|---|---|
| 1,189,632 | 7/1916 | Seitz | 254/88 |
| 2,012,635 | 8/1935 | Paden | 254/88 |
| 2,142,379 | 1/1939 | Sharkey | 254/88 |
| 2,254,149 | 8/1941 | Jensen | 254/88 |
| 2,353,021 | 7/1944 | Fares | 254/88 |
| 2,556,796 | 6/1951 | Care et al. | 254/88 |
| 2,675,210 | 4/1954 | Lowber | 254/88 |
| 2,858,906 | 11/1958 | Minick | 188/32 |
| 3,661,229 | 5/1972 | Stonhaus . | |
| 3,937,263 | 2/1976 | Hill et al. | 254/88 |
| 4,034,961 | 7/1977 | Breen . | |
| 4,058,292 | 11/1977 | Goodrich . | |
| 4,165,862 | 8/1979 | Bennett | 254/88 |
| 4,427,179 | 1/1984 | Price . | |

Primary Examiner—Robert C. Watson

[57] ABSTRACT

A two piece ramp for drive on leveling of recreational vehicles and trailers. Two interlocking substantially rectangular blocks stacked in horizontal aligned have matching beveled end. The beveled ends slant inwardly in an upwardly direction. The longer base block contains two transverse grooves on the top surface which correlate and interlock with two transverse ridges located on the bottom surface of the smaller top block. When assembled, the angle of the inclined ramp of the base block is continued up into the inclined ramp of the top block, making one continuous inclined ramp. The width of the ramp is sufficiently sized for accommodating the conventional tires commonly used on trailers and RV's and the length is designed for lateral positioning between tandem wheels. The angle of the inclined ramp is structured for easy loading and helps prevent overshooting the targeted position. The flat top area of each block having a slip resistant textured surface.

3 Claims, 2 Drawing Sheets

TRAILER LEVELER

BACKGROUND OF THE INVENTION

1. Field of the Invention

This invention relates to devices useful for leveling parked recreational vehicles and trailers when positioned on an angled surface. The present invention is particularly directed towards a device utilizing two stacked interlocking blocks employed as drive-over wheel height adjusters for tandem wheeled trailers.

2. Description of the Prior Art

When parking certain vehicles, especially recreational trailers, it is often necessary for the vehicle to be level in order for certain appliances, such as refrigerators, to work correctly. It is also more comfortable for the user to sleep in a level position. One very efficient method of leveling vehicles includes the use of mechanical hydraulic or pneumatic jacks. Unfortunately these devices are quite expensive and unless they are attached to the vehicle when manufactured, major alterations are needed to install such devices to existing vehicles.

The majority of recreational trailer owners choose parking sites which are substantially level to begin with and usually only minor adjustments of a few inches are required to level the vehicle. These owners also generally prefer a leveling device which is quick and easy to use and requires little of the already limited available space to storage.

A search was conducted for patented devices useful for leveling vehicles. These past art patents were obtained from the following classes and subclasses;
280/6R, 6.11, 180/41, 188/32, 254/94 and 88.

The past art devices which I considered most pertinent to my invention are as follows:

1. U.S. Pat. No. 3,661,229, dated May 9, 1972, was issued to Stonhaus for a leveling device comprised of two inclined ramps.

2. Breen was granted U.S. Pat. No. 4,034,961, dated July 12, 1977 for "Drive-On Leveling Device" containing two curved ramps.

3. On Nov. 15, 1977, Goodrich et al was issued U.S. Pat. No. 4,058,292 for a leveling system using inclined ramps designed to be attached to the vehicle by linking means. This linking means provides coded indicia indicating the required distance the wheels need to travel to level the vehicle.

4. Bennett was granted U.S. Pat. No. 4,165,862 on Aug. 28, 1979 for a leveling device comprised of vertically stacked inclined slabs.

5. U.S. Pat. No. 4,427,179, dated Jan. 24, 1984, was issued to Price for a leveling apparatus comprised of a plurality of ramp planks.

The past art patent which seems closest in proximity to my device is U.S. Pat. No. 4,165,862. Although ramp style leveling devices are necessarily somewhat similar, this device contains significant disadvantages not present in my device. The Bennett ramp is not designed to be driven completely over. A driver can approach the ramp from only one direction to properly position his wheels on top.

The remaining aforementioned patents also teach devices which are not designed to be completely driven over and therefore can be approached by the wheel for use in only one direction. There are instances when the capability to drive completely over the ramp is more convenient, such as if the driver accidentally misjudges the distance and over shoots the ends of the ramps. Using one of the devices shown in the past art, the driver would have to get out of the towing vehicle and replace each ramp in front of each tire and try the procedure again. In a trailer having tandem wheels, the driver would have to move up to four leveling devices.

Past art patent U.S. Pat. No. 4,058,292 teaches a device which provides for a wide variation of height adjustments, which I feel is unnecessary. Height adjustments over four to six inches are seldom required by recreational trailer users, due to the fact most commercial and government trailer camp sites are substantially level to begin with. This device appears very large and would require a great amount of storage area. Also, it would not fit between the typical tandem wheels of a recreational trailer.

Past art patents including U.S. Pat. Nos. 3,661,229, 4,034,961, and 4,058,292 do not provide level surfaces for the parked tire. This situation appears to pose a potential rolling problem and would require the use of additional blocking means. Two of the devices do provide leveling structures with an additional blocking means. These additional wheel blocking devices require added time and effort to position, and put the installer's hand at risk of being smashed if the trailer slipped forward before he could get the wheel blocked.

The afore mentioned patents represented devices which appear most relevant to my invention. They do not seem to illustrate the advantages and benefits provided by my invention, particularly for use in fairly level camp sites. Most of the past art devices disclosed jacking systems and interlocking multi-step wheel blocks difficult to use. My invention eliminates the mechanical actions of jacks and the use of complicated curved surfaces in a simple drive-on and drive-over block structure easy to position and safe to use.

SUMMARY OF THE INVENTION

In practicing my invention, I have developed a leveling device primarily for recreational trailers having tandem wheels. The invention is comprised of two stacked interlocking rectangular elongated blocks, one positioned on top the other, both having inclined beveled ends. The two interlocking blocks collectively form a ramp with the inclined end of the base block continuing up into the bevel end of the smaller top block. The top surface of the base block contains transverse grooves adjacent each end which coincide and interlock with two transverse ridges located on the bottom surface of the top block. These grooves and ridges serve as removable attachment means for the two sections of the ramp. The surface of each block is textured to provide better traction for the tires and also helps to secure the attachment means. The ramp can be used as a unit or unassembled and either the top or base block used. Each block is approximately two to three inches high, by four or five inches wide. The length of the base block is approximately seventeen inches which enables the device to be used on recreational vehicles, hereafter referred to as RV's, or trailers having tandem wheels. The top surface of the base block is approximately eleven inches in length as is the bottom surface of the top block. The top surface of the top block is approximately seven inches in length which thereby provides each end of the ramp with equally sized beveled angles of approximately thirty degrees. This ramp can be manufactured of wood, plastic, fiberglass or light weight metal.

The primary object of the invention is to provide a non-mechanical, easy to use ramp for leveling vehicles which does not require lengthy and complicated adjustments or assembly, and is low in cost to manufacture.

A further object of my invention is to provide a ramp which provides a level parking surface for the supported tire, thereby lessening the possibility of the tire rolling and the necessity of providing support blocks.

Another object of my invention is to provide a ramp which can be disassembled into two separate sections, with each section capable of being individually utilized as a ramp.

An even further object of my invention is to provide a ramp which can be driven completely over, thereby being two-directional or enabling either end to be used as the inclined loading surface of the ramp.

A still further object of my invention is to provide a ramp system which is adaptable for use with tandem wheels, being of sufficient size to be positioned between the two adjacent tandem tires.

An even further object of my invention is to provide a ramp which has a textured top surface providing a nonslip gripping surface for tires.

A still further object of my invention is to provide a ramp which is relatively small, light weight and easy to transport, requiring only a small amount of storage space. This ramp is not comprised of a multiple of small separate sections which could become lost or misplaced.

Other objects and advantages of my invention will become apparent with a reading of the specification and subsequent comparison with the accompanying drawings.

Figure 1:
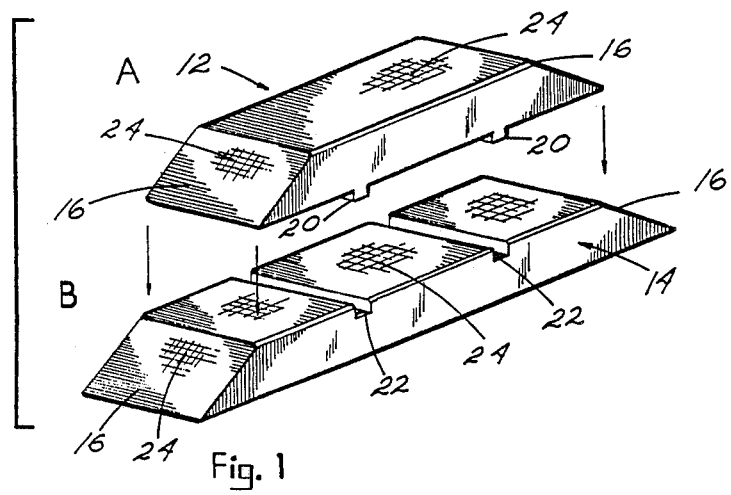
FIG. 1 A is a perspective illustration of the top block positioned over B, the base block.
Figure 2:
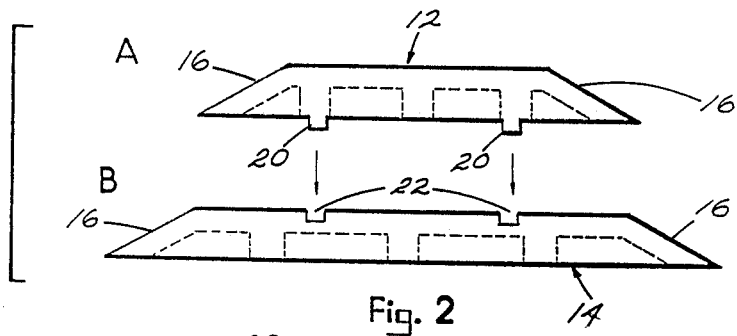
FIG. 2 A is a side view of the top block, and B is a side view of the base block with spaced lines illustrating inside hollowing of the blocks for lightness.
Figure 3:
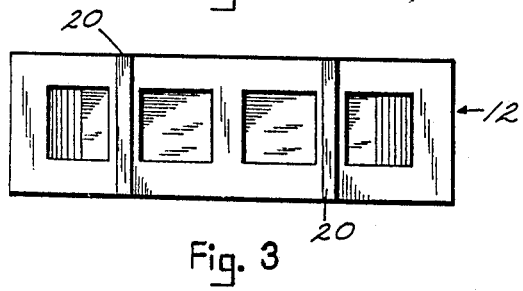
FIG. 3 is a bottom view of the top block.
Figure 4:
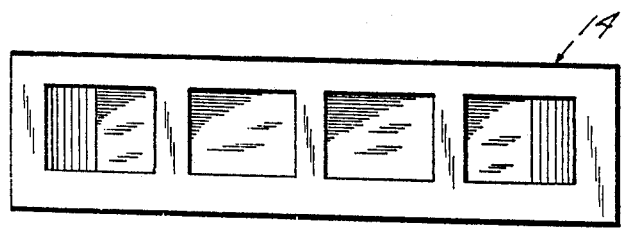
FIG. 4 is a bottom view of the base block.
Figure 5:
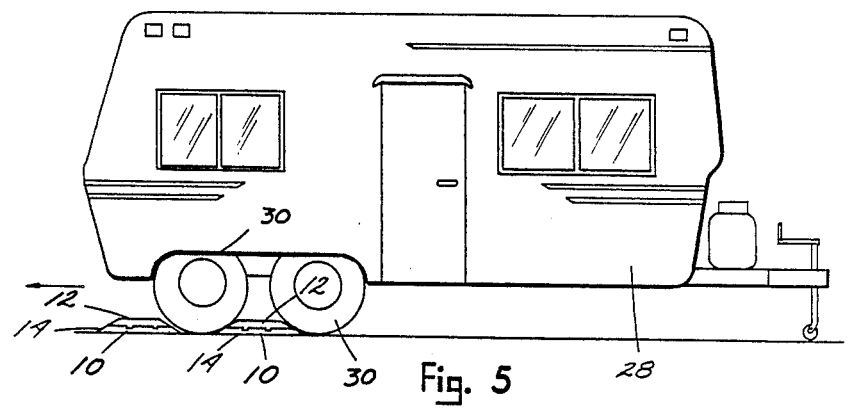
FIG. 5 is an in use side view showing a tandem wheel trailer in the beginning process of backing over two sets of the ramp.

DRAWING REFERENCE NUMBERS 10 ramp
12 top block
14 base block
16 inclined beveled ends
18 inclined ramp surface
20 transverse ridges
22 transverse grooves
24 textured surface
26 wheel
28 vehicle
30 tandem wheels

DESCRIPTION OF THE PREFERRED EMBODIMENT

Referring now to the drawings and to FIG. 1 where the preferred embodiment of the invention is illustrated in an unassembled view. Ramp 10 is comprised of two interlocking overlaying sections, the top section being top block 12 and the bottom section being base block 14 as shown in FIGS. 1 through 6. Both blocks are substantially rectangular in shape, each having two inclined beveled ends 16. The inclined beveled end 16 of base block 14 continues up into inclined beveled end 16 of top block 12, collectively forming one longer continuous inclined ramp surface 18, best seen in FIG. 5 and 6. The angle of inclined ramp surface 18 is engineered to allow a progressive upward grade which is not too steep so as to require excess speed or power to load wheel 26 onto ramp 10, which would usually result in overshooting the intended position. The bottom surface of top block 12 has two transverse ridges 20 one located adjacent each inclined beveled end 16. As a locking device, transverse ridges 20 are sized to be releasably inserted into two transverse grooves 22 similarly aligned one adjacent each inclined beveled end 16 of base block 14, in FIGS. 1 and 2. The top surface of base block 14 and the top surface of top block 12 are provided with a frictional finish, textured surface 24, shown in FIG. 1, which helps to provide traction for wheel 26.

Figure 6:
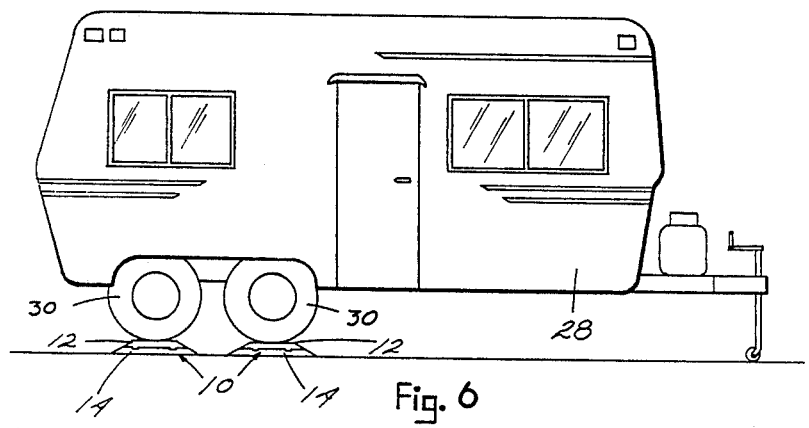
FIG. 6 shows the tandem wheel trailer positioned on the ramps.
Figure 7:
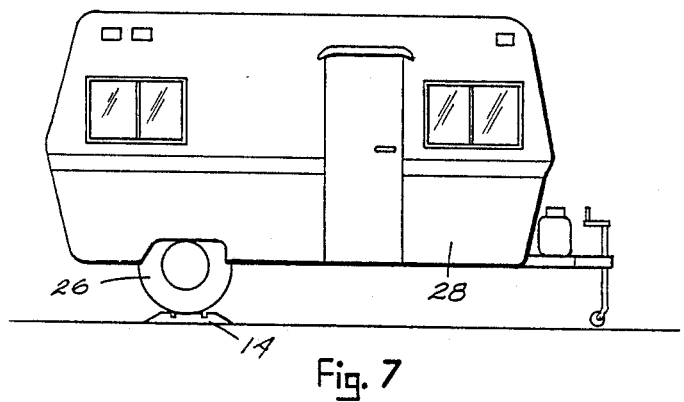
FIG. 7 shows a single wheeled trailer leveled by the base section of the ramp.

In use, the driver estimates the required distance wheel 26 should be elevated and chooses to use assembled ramp 10 or a single block either top block 12 or base block 14. If a greater height is required, ramp 10 is chosen and positioned laterally behind or in front of wheel 26. Vehicle 28 is then reversed or advanced over ramp 10 and positioned in place, shown in FIG. 7. If vehicle 28 has tandem wheels 30, which ramp 10 is specifically sized to accommodate, ramp 10 is positioned between tandem wheels 30, with a second ramp 10 positioned either behind or in front of tandem wheels 30, shown positioned behind the second tandem wheel 30 in FIG. 5. Vehicle 28 is then reversed over both ramps 10 simultaneously and positioned on the top of each ramp 10, as seen in FIG. 6.

Although I have described my invention in detail in the specification, it is to be understood that alterations may be practiced in the structure and design of the device which remain within the scope of the appended claims.

What I claim as my invention is:

1. A drive-on height adjustment device for raising the wheels of a vehicle, and which comprises:

a. a two piece leveling ramp;
      said leveling ramp being two substantially rectangular beveled ended interlocking blocks; said blocks structured for longitudinal placement horizontally with a first said block positioned on top of a second said block; said first block being the top block and said second block being the base block; each said block having a top and bottom surface, two side edges, and two inclined said beveled ends which, when assembled with said bottom surface of said top block to said top surface of said base block, form one continuous inclined ramp at each said end terminating upwardly into a flattened area sized to maintain one of said vehicle wheels thereon;

b. a releasable attachment means;
      said attachment means being interlocking transverse grooves and ridges; said top surface of said base block having at least two said transverse grooves one adjacent each said inclined beveled end; said bottom surface of said top block having at least two said transverse ridges one adjacent each said inclined beveled end, said transverse ridges sized and positioned to align with said transverse grooves and fit releasably inserted therein;
c. a non-slip texture on said top and said beveled end surfaces of each said block;
d. said two piece drive-on leveling ramp being of a length to fit between said vehicle wheels with said wheels arranged in tandem.

2. The two piece drive over leveling ramp of claim 1 wherein said top block detached from said base block is useful individually for low level said wheel height adjustment.

3. The two piece drive over leveling ramp of claim 1 wherein said base block detached from said top block is useful individually for low level said wheel height adjustment.

* * * * *